United States Patent
Ando et al.

(10) Patent No.: US 7,963,852 B2
(45) Date of Patent: Jun. 21, 2011

(54) SPLINE SHAFT

(75) Inventors: Junji Ando, Kariya (JP); Yoshiaki Senga, Nagoya (JP); Tomoo Suzuki, Chita-gun (JP); Kazunori Aoki, Toyoake (JP); Toshiyuki Saito, Toyoake (JP); Hirofumi Kuwabara, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 566 days.

(21) Appl. No.: 12/089,214

(22) PCT Filed: Oct. 6, 2006

(86) PCT No.: PCT/JP2006/320433
§ 371 (c)(1),
(2), (4) Date: Apr. 4, 2008

(87) PCT Pub. No.: WO2007/043637
PCT Pub. Date: Apr. 19, 2007

(65) Prior Publication Data
US 2010/0130291 A1    May 27, 2010

(30) Foreign Application Priority Data
Oct. 7, 2005 (JP) ................................. 2005-295097

(51) Int. Cl.
*F16C 3/03* (2006.01)
(52) U.S. Cl. ............................................. 464/9; 464/16
(58) Field of Classification Search .................. 464/8, 9, 464/16, 162; 427/249.1, 249.2, 249.7
See application file for complete search history.

(56) References Cited

U.S. PATENT DOCUMENTS

| 3,367,142 A | 2/1968 | Groves et al. |
| 5,288,556 A | 2/1994 | Lemelson |
| 6,920,968 B2 | 7/2005 | Sakai et al. |
| 7,004,297 B2 | 2/2006 | Ando et al. |
| 7,497,783 B2 * | 3/2009 | Azuma et al. ................. 464/162 |
| 7,650,976 B2 | 1/2010 | Ishikawa et al. |
| 2003/0217904 A1 | 11/2003 | Ando et al. |
| 2005/0167225 A1 | 8/2005 | Sakai et al. |

(Continued)

FOREIGN PATENT DOCUMENTS

JP          54 9340          1/1979

(Continued)

OTHER PUBLICATIONS

Wagner, E. R. "Splines and Axial Motion Devices" in Universal Joint and Drveshaft Design Manual, AE-7, Society of Automotive Engineers, Inc., Warrendale, PA, pp. 185-198, TJ1079.S62 1979.*
DeGaspari, John "Super-slick: a near frictionless diamond-hard carbon coating is getting its first tests in commercial applications" Mechanical Engineering CIME, Apr. 1, 1999. Retrieved from the Internet: URL http://www.allbusiness.com, retrieved on Sep. 28, 2010.*

(Continued)

*Primary Examiner* — Greg Binda
(74) *Attorney, Agent, or Firm* — Oblon, Spivak, McClelland, Maier & Neustadt, L.L.P.

(57) ABSTRACT

A spline shaft that can suppress occurrence of stick slip by measures other than just simply making the surface roughness smaller. The spline shaft includes a first shaft with an outer-peripheral spline formed, and a second shaft with an inner-peripheral spline, which engages with the outer-peripheral spline peripherally and that is made slidable axially, formed. And, at least either one of the outer-peripheral spline and the inner-peripheral spline includes a substrate whose surface is formed to a predetermined surface roughness, and an amorphous carbon-system hard thin film, which coats and forms the surface of substrate.

14 Claims, 4 Drawing Sheets

U.S. PATENT DOCUMENTS

2006/0210833 A1  9/2006  Saito et al.
2007/0108009 A1  5/2007  Ando et al.

FOREIGN PATENT DOCUMENTS

| JP | 3023385 | 4/1996 |
| JP | 2004 359087 | 12/2004 |
| JP | 2005 2888 | 1/2005 |
| JP | 2006 22882 | 1/2006 |

OTHER PUBLICATIONS

U.S. Appl. No. 10/544,674, filed Aug. 4, 2005, Ando, et al.
English translation of Abstract of JIS B 0601:1994. Retrieved from the Internet URL http://www.misumiusa.com/CategoryImages/Metric_2009_pdf/p2839.pdf.

* cited by examiner

SPLINE SHAFT

TECHNICAL FIELD

The present invention is one that relates to a spline shaft for transmitting torque while making it possible to move relatively to each other in axial-line direction.

BACKGROUND ART

As an example of spline shafts, there is a propeller shaft that transmits the driving force of powder unit, which is boarded on vehicle, to wheel. This propeller shaft is placed between transmission, which is connected to power unit, and differential gear, which is connected to wheel, thereby transmitting the output of the transmission to the differential gear. Here, depending on shocks from road surface and vehicle's driving conditions, and the like, the relative positional relationship between the transmission and the differential gear moves. In particular, in order to absorb the relative position's movement in the front/rear direction of vehicle, the propeller shaft is divided into a first shaft, which is provided with an outer-peripheral spline, and a second shaft, which is provided with an inner-peripheral spline (see Japanese Unexamined Patent Publication (KOKAI) Gazette No. 2004-359,087). That is, it is configured so that the outer-peripheral spline and the inner-peripheral spline can slide axially (in vehicle's front/rear direction).

DISCLOSURE OF INVENTION

By the way, a phenomenon, the so-called stick slip, might occur because of the fact that the interval between the transmission and the differential gear undergoes a change upon accelerating and decelerating vehicle. The stick slip is a phenomenon that the first shaft's outer-peripheral spline and the second shaft's inner-peripheral spline move relatively in axial direction intermittently. And, because of the stick slip, body vibrations and noises come to occur.

It is possible to suppress the occurrence of this stick slip by means of lowering the static friction coefficient between the outer-peripheral spline and the inner-peripheral spline. Hence, in order to lower the static friction coefficient, it is possible to think of making the surface roughness of the surfaces of the outer-peripheral spline and inner-peripheral spline smaller. However, in the case of setting the surface roughness at such a very low value as low as Rz (10-point average roughness based on JIS B 0601: 1994, and being the same hereinafter) 0.1 μm or less, for instance, the static friction coefficient has increased adversely because of the squeeze effect, and the like. Moreover, in the case of setting the surface roughness at such a small value as Rz 0.1 μm or less, the dynamic friction coefficient with respect to sliding speed becomes a negative gradient in intermediate sliding range, specifically, in a range where the relative sliding speed between the first shaft and the second shaft is 0.1 m/s or more. This results from the fact that it makes transition to mixedly lubricated state being accompanied by the increment of macroscopic oil film between the outer-peripheral spline and the inner-peripheral spline. Here, the case where the dynamic friction coefficient is a negative gradient with respect to sliding speed is such a case that the dynamic friction coefficient decreases as the sliding speed increases. And, by means of the fact that the dynamic friction coefficient with respect to the sliding speed thus becomes a negative gradient, there is a fear that the stick slip might occur.

The present invention is one which has been done in view of such circumstances, and its object is to provide a spline shaft, which can securely suppress the occurrence of stick slip by means of measures other than just simply making the surface roughness smaller.

A spline shaft according to the present invention is a spline shaft for transmitting torque while making it possible to move relatively to each other in axial-line direction, and is equipped with a first shaft and a second shaft. The first shaft is a shaft that is provided with an outer-peripheral spline, which is formed on its outer peripheral surface. The second shaft is a shaft that is provided with an inner-peripheral spline, which is formed on its inner peripheral surface, which engages with said outer-peripheral spline peripherally, and which is made slidable axially. And, at least either one of the outer-peripheral spline and the inner-peripheral spline is characterized in that it is equipped with a substrate whose surface is formed to a predetermined surface roughness, and an amorphous carbon-system hard thin film, which coats and forms the surface of said substrate.

That is, the spline shaft according to the present invention is such that the amorphous carbon-system hard thin film is formed on the outer-peripheral spline's superficial portion alone, on the inner-peripheral spline's superficial portion alone, or on both of the superficial portions of the outer-peripheral spline and inner-peripheral spline. However, in the case of making the amorphous carbon-system hard thin film be formed on the outer-peripheral spline's superficial portion alone, the manufacturing becomes very easy. This is because of the fact that, when forming the amorphous carbon-system hard thin film by physical vapor deposition method or chemical vapor deposition method, the film forming onto the outer surface of axis-shaped member can be done very easily. Here, when referring to "surface" simply, it means the member's surface itself; namely, it means an externally exposed surface of the member's surfaces. Moreover, when referring to "superficial portion," it not only means the member's surface but also it is meant to include such a range that is from the member's surface to a predetermined depth.

Here, the amorphous carbon-system hard thin film means amorphous hard thin film in which carbon is a major component. As for this amorphous carbon-system hard thin film, it can be adapted to being one that is made from diamond-like carbon (DLC) alone; one in which either one of silicon (Si), tungsten (W) and titanium (Ti) is contained in DLC; or one that is a laminated film (WC/C) of tungsten carbide (WC) and DLC; for instance. Note that, in the case of being WC/C, it is adapted so that a layer of DLC is placed on the outermost surface. Moreover, a substrate of the first shaft and second shaft is such that both of them are made of metallic material, such as steel stock, mainly. For example, carbon steel or alloy steel for mechanical structure can be used for a substrate of these. However, a substrate of these includes, in addition to one that comprises a metallic material alone, one that comprises a metallic-material portion in which an undercoat treatment is performed onto its surface.

And, since this amorphous carbon-system hard thin film is full of solid lubricity, and is amorphous, a surface roughness of the amorphous carbon-system hard thin film itself is small. Moreover, the amorphous carbon-system hard thin film has such a property (traceability) that it follows a surface roughness of its undercoat, namely, a surface roughness of member before forming the amorphous carbon-system hard thin film. That is, in the spline shaft according to the present invention, a surface roughness of the amorphous carbon-system hard thin film becomes one that follows a surface roughness of substrate, which corresponds to its undercoat.

That is, when a surface roughness of substrate is large, a surface roughness after forming the amorphous carbon-system hard thin film also becomes large; and, when a surface roughness of substrate is small, a surface roughness after forming the amorphous carbon-system hard thin film also becomes small. Moreover, since a surface roughness of the amorphous carbon-system hard thin film itself is small, in the case of making a surface roughness of substrate small sufficiently, a surface roughness after forming the amorphous carbon-system hard thin film also becomes small sufficiently.

Therefore, in accordance with the spline shaft according to the present invention, it is possible to set a surface roughness after coating and forming the amorphous carbon-system hard thin film at a predetermined surface roughness by forming a surface roughness of the substrate to a predetermined surface roughness. That is, it is possible to adequately control a surface roughness of the spline after forming the amorphous carbon-system hard thin film.

That is, by forming a surface roughness of the substrate to an adequate surface roughness in advance and then coating and forming a surface of this substrate by means of the amorphous carbon-system hard thin film, it is possible to establish a static friction coefficient between the outer-peripheral spline and the inner-peripheral spline so that it becomes lower securely.

As a result, the outer-peripheral spline and inner-peripheral spline can undergo continuous relative movement smoothly without undergoing intermittent relative movement. That is, it is possible to suppress the occurrence of stick slip. Moreover, since the amorphous carbon-system hard thin film is less likely to wear, it is possible to suppress the occurrence of stick slip even when the spline shaft according to the present invention is used for a long period of time. In addition, as for the amorphous carbon-system hard thin film, in the case of making it into one in which silicon, tungsten, titanium, or the like, is contained in DLC, it is possible to form a relatively thick film. By forming a relatively thick film, it is possible to secure the durability of the amorphous carbon-system hard thin film with respect to wear.

By the way, as for one which coats a surface of the substrate, it is possible to think of nylon coat, diamond coat, and the like. However, nylon coat has no such property that it follows a surface roughness of the substrate, which corresponds to undercoat; although diamond coat has traceability, it is one which is very inferior to the traceability of the amorphous carbon-system hard thin film. Moreover, diamond coat is such that fine roughness is formed because of its own crystallinity and consequently its surface roughness has enlarged. Thus, the present invention can suppress the occurrence of stick slip as described above by utilizing the amorphous carbon-system hard thin film's own property that nylon coat, diamond coat, and so forth, do not possess.

Here, it is allowable to set the substrate's predetermined surface roughness at from Rz (10-point average roughness based on JIS B 0601: 1994) 0.1 μm or more. By setting the substrate's surface roughness at Rz 0.1 μm or more, it is possible to set the amorphous carbon-system hard thin film's surface roughness at Rz 0.1 μm or more. That is, as described above, by means of the fact that spline's surface roughness is too small, it is contrarily possible to inhibit static friction coefficient from enlarging. To put it differently, it is possible to securely make static friction coefficient smaller. Moreover, in intermediate sliding range, specifically, in a range where the relative sliding speed between the first shaft and the second shaft is 0.1 m/s or more, it is possible to turn a dynamic friction coefficient with respect to the sliding speed into a positive gradient. Therefore, in such a case that the relative sliding speed between both shafts becomes 0.1 m/s or more, it is possible to securely suppress the occurrence of stick slip. Note that the case where a friction coefficient is a positive gradient with respect to a siding speed is such a case that the friction coefficient is constant or increases as the sliding speed increases.

In addition, it is allowable to set a predetermined surface roughness of the substrate at Rz 5.0 μm or less. By thus setting it at such a sufficiently small surface roughness, it is possible to make a static friction coefficient between the outer-peripheral spline and the inner-peripheral spline smaller sufficiently.

In addition, it is allowable to form the amorphous carbon-system hard thin film so that the relationship between the friction coefficient of the outer-peripheral spline and that of inner-peripheral spline becomes as follows. Specifically, a friction coefficient between the outer-peripheral spline and the inner-peripheral spline can be set so as to be 0.15 or less in such a range that a relative sliding speed between the first shaft and the second shaft is 0.1 m/s or less. Moreover, a ratio of a static friction coefficient between the outer-peripheral spline and the inner-peripheral spline with respect to a dynamic friction coefficient between the outer-peripheral spline and the inner-peripheral spline when the sliding speed is 0.1 m/s can be 1.4 or less. The ratio of the static friction coefficient with respect to the dynamic friction coefficient (a ratio between the static friction coefficient and the dynamic friction coefficient) can preferably be 1.2 or less, can more preferably be 1.0 or less. And, by setting the dynamic friction coefficient between the outer-peripheral spline and the inner-peripheral spline and the static friction coefficient between them so as to be as aforementioned, it is possible to suppress the occurrence of stick slip securely.

In particular, it is more allowable to set the ratio of the static friction coefficient with respect to the dynamic friction coefficient (a ratio between the static friction coefficient and the dynamic friction coefficient) at 1.0 or less in such a range that the sliding speed is 0.1 m/s or less. By means of this, in such a range that the sliding speed is 0.1 m/s or less, it is possible to turn friction coefficient into positive gradient with respect to sliding speed. Therefore, it is possible to suppress the occurrence of stick slip more securely.

Here, it is allowable to set a surface roughness of the amorphous carbon-system hard thin film at Rz (10-point average roughness based on JIS B 0601: 1994) 5.0 μm or less. The surface roughness can preferably be Rz 3.0 μm or less, more preferably be Rz 0.5 μm or less. Moreover, it is allowable to preferably set the surface roughness of the amorphous carbon-system hard thin film at Rz 0.1 μm or less. That is, by making the surface roughness of the amorphous carbon-system hard thin film fall within the aforementioned range, it is possible to make the static friction coefficient between the outer-peripheral spline and the inner-peripheral spline and the dynamic friction coefficient between them smaller. In addition thereto, it is possible to turn the relationship between the friction coefficients of the outer-peripheral spline and inner-peripheral spline into the aforementioned relationship.

Moreover, it is allowable to set a film thickness of the amorphous carbon-system hard thin film at from 0.4 or more to 10.0 μm or less. A lower limit of the film thickness can preferably be 0.7 μm or more, more preferably be 0.8 μm or more. In addition, an upper limit of the film thickness can preferably be 8.0 μm or less, more preferably be 4.0 μm or less. By means of this, the amorphous carbon-system hard thin film can follow the surface roughness of the substrate securely. Moreover, even when the spline shaft according to the present invention is employed for a long period of time, it is possible to turn it into an amorphous carbon-system hard thin film in which wear/come-off is less likely to occur. Therefore, even when the spline shaft according to the present invention is employed for a long period of time, it is possible to suppress the occurrence of stick slip more securely.

Moreover, it is allowable to set a hardness of the amorphous carbon-system hard thin film at 800 Hv or more. By means of this, it is possible to suppress the wear of the amorphous carbon-system hard thin film. Therefore, even when the spline shaft according to the present invention is employed for a long period of time, it is possible to suppress the occurrence of stick slip securely.

Moreover, it is allowable to set an adhesion force of the amorphous carbon-system hard thin film toward the substrate at 10 N or more. By means of this, it is possible to inhibit the amorphous carbon-system hard thin film from coming off from the substrate. Therefore, even when the spline shaft according to the present invention is employed for a long period of time, it is possible to suppress the occurrence of stick slip securely.

In particular, in order to improve the adhesion force of the amorphous carbon-system hard thin film toward the substrate, it is allowable to do it as hereinafter described. Specifically, it is allowable to perform a treatment of undercoat, which comprises at least either one of nitrided layer, Si layer, Cr layer and CrN layer, onto a superficial portion of the substrate of at least either one of the outer-peripheral spline and the inner-peripheral spline. In this case, the amorphous carbon-system hard thin film comes to coat and form an undercoat layer, which is formed on a superficial portion of the substrate. And, by means of this undercoat layer that is formed by means of this undercoat treatment, it is possible to obtain the adhesion force between the amorphous carbon-system hard thin film and the substrate sufficiently.

Note that it is allowable as well to form an intermediate layer between the substrate and the amorphous carbon-system hard thin film. However, a film thickness of this intermediate layer is formed very thin compared with a film thickness of the amorphous carbon-system hard thin film, a surface roughness of the intermediate layer's surface becomes one which follows a surface roughness of the substrate.

Moreover, it is allowable that the amorphous carbon-system hard thin film can be formed by means of physical vapor deposition method (PVD) or high-frequency plasma chemical vapor deposition method (CVD) at 200° C. or less. Here, when the amorphous carbon-system hard thin film is formed at such a high temperature as 500° C., for instance, there is a fear of degrading strength of the substrate of the first shaft and/or second shaft, an object to be subjected to film forming. However, by forming the amorphous carbon-system hard thin film at 200° C. or less, it is possible to prevent the degradation of strength of the substrate, an object to be subjected to film forming. In particular, by setting the film-forming temperature of the amorphous carbon-system hard thin film at 150° C. or less, it is possible to prevent the degradation of strength of the substrate more securely.

Here, it is allowable to apply the above-described spline shaft to a propeller shaft of vehicle. Specifically, in this instance, the spline shaft is a propeller shaft, which transmits a driving force of power unit that is boarded on vehicle to wheel; the first shaft is such that an opposite end side is connected with either one side of said power unit and wheel, and the outer-peripheral spline is formed on an outer peripheral surface of another opposite end side; and the second shaft is such that an opposite end is connected with another one side of the power unit and wheel, and the inner-peripheral spline, which engages with the outer-peripheral spline peripherally and which is made slidable axially, is formed on an inner peripheral surface of another opposite end side. Thus, by applying the spline shaft according to the present invention to the propeller shaft, it is possible to securely suppress vehicle-body vibrations and abnormal noises, which are accompanied by the occurrence of stick slip.

Moreover, it is allowable to interpose a lubricant between the outer-peripheral spline and the inner-peripheral spline. By means of this, it is possible to make the longevity of the outer-peripheral spline and inner-peripheral spline longer while making the static friction coefficient between them smaller adequately.

So far, although the present invention has been explained regarding the case where it is grasped as a spline shaft, in addition to it, the present invention can be grasped as a method for manufacturing spline shaft.

Specifically, a method according to the present invention for manufacturing spline shaft is a method for manufacturing spline shaft for transmitting torque while making it possible to move relatively to each other in axial-line direction. Here, the spline shaft is equipped with a first shaft that is provided with an outer-peripheral spline, which is formed on its outer peripheral surface, and a second shaft that is provided with an inner-peripheral spline, which is formed on its inner peripheral surface, which engages with the outer-peripheral spline peripherally, and which is made slidable axially. And, at least either one of the outer-peripheral spline and the inner-peripheral spline is characterized in that, after forming a surface of substrate to a predetermined surface roughness, an amorphous carbon-system hard thin film is formed onto the surface of substrate to coat it.

By means of this, it is possible to demonstrate the identical effects as the effects that result from the above-described spline shaft. Moreover, it is possible to apply the other features, which are applied to the above-described spline shaft, to the aforesaid method for manufacturing spline shaft. In this instance, the same effects as their respective effects are demonstrated.

BEST MODE FOR CARRYING OUT THE INVENTION

Next, specific examples will be named hereinafter to explain the present invention in more detail. A case where a spline shaft according to the present invention is applied to the propeller shaft 10, which is boarded on vehicle, will be named hereinafter as an example to explain it.

(1) Construction of Driving System for Vehicle

Figure 1:
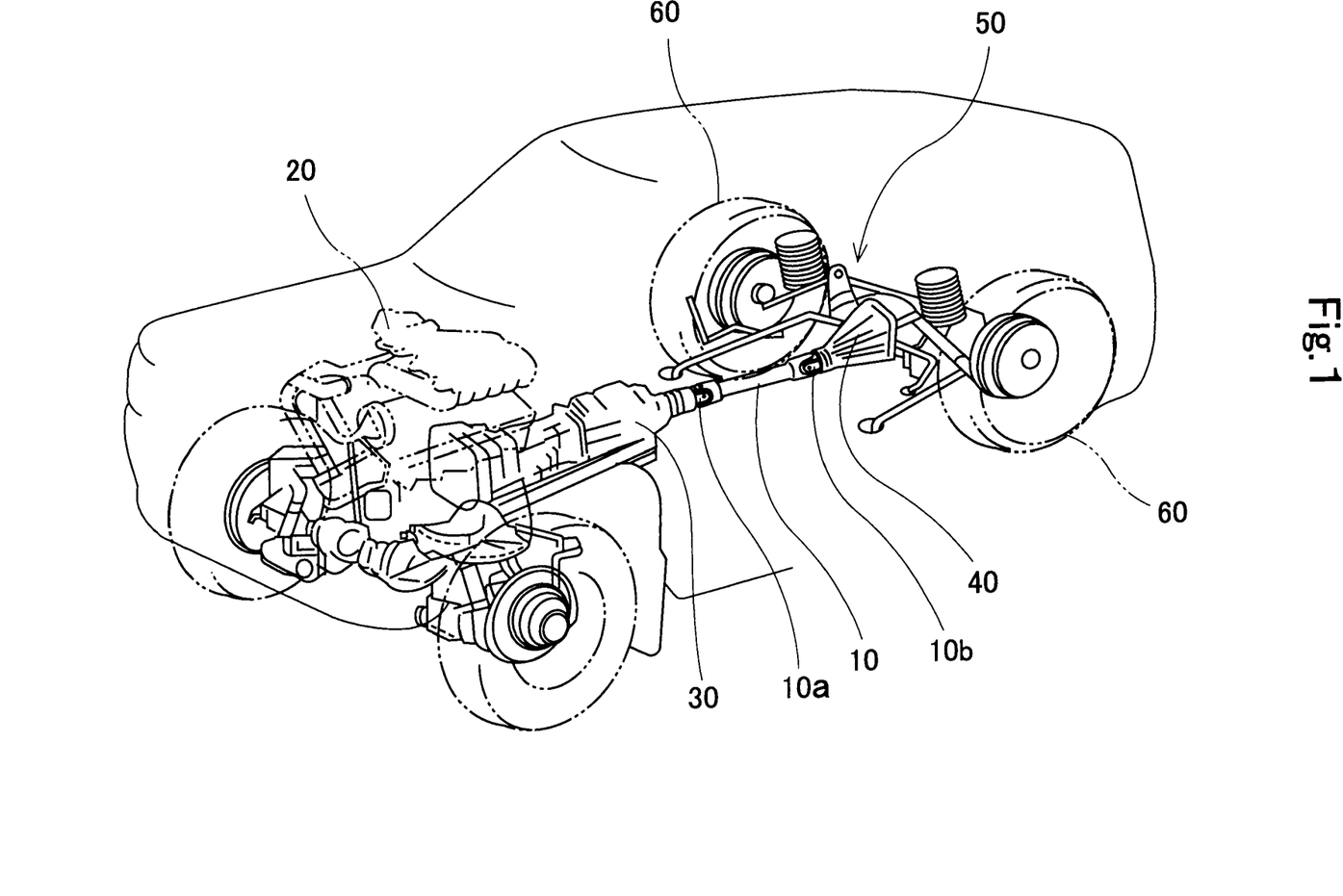
FIG. 1 is a perspective diagram for illustrating a construction of a driving system for vehicle.

First of all, a construction of a driving system for vehicle, to which the propeller shaft 10 is applied, will be explained with reference to FIG. 1. Here, FIG. 1 is a perspective diagram for illustrating a construction of a driving system for vehicle. As shown in FIG. 1, the vehicle is a front engine rear drive (FR) car. Specifically, a driving system of the vehicle is equipped with an engine 20 (the power unit in the present invention), which is disposed in vehicular front, a transmission 30, a propeller shaft 10, a differential gear 40, and a rear axle 50.

The transmission 30 is disposed on the front side of the vehicle, and is placed in the rear of the engine 20. And, the transmission 30 varies the driving force, which is output from the engine 20, by shifting gears. The propeller shaft 10 is placed so as to extend in the vehicular front/rear direction. The vehicular front-end side of this propeller shaft 10 is connected to an output shaft (not shown) of the transmission 30. The vehicular rear-end side of the propeller shaft 10 is connected to an input shaft (not shown) of the differential gear 40, which is placed on a vehicular rear side. Specifically, the propeller shaft 10 transmits the engine 20's driving force, which is output from the transmission 30, to the differential gear 40. And, the differential gear 40 transmits the driving force, which is transmitted by way of the propeller shaft 10, to left and right rear wheels 60 by way of left and right rear axles 50.

Thus, the propeller shaft 10 is a shaft for transmitting the driving force of the engine 20, which is placed in vehicular front, to the rear wheels 60. Here, the relative positions of the transmission 30 and differential gear 40 move depending on the shocks from road surfaces, the driving conditions of the vehicle, and the like. And, even when the transmission 30 and the differential gear 40 move in the vehicular front/rear direction, in the vehicular left/right direction and in the vehicular up/down direction relatively, the propeller shaft 10 is constructed so that it can transmit the driving force from the transmission 30 to the differential gear 40 securely. Concretely, the vehicular front-end side of the propeller shaft 10 and the output shaft of the transmission 30 are connected by means of a universal joint 10a. Moreover, the vehicular rear-end side of the propeller shaft 10 and the input shaft of the differential gear 40 are connected by means of a universal joint 10b. In addition, the propeller shaft 10 is constructed so that it is expansible/contractible in the axial direction. Hereinafter, the detailed construction of the propeller shaft 10 will be described.

(2) Detailed Construction of Propeller Shaft 10

Figure 2:
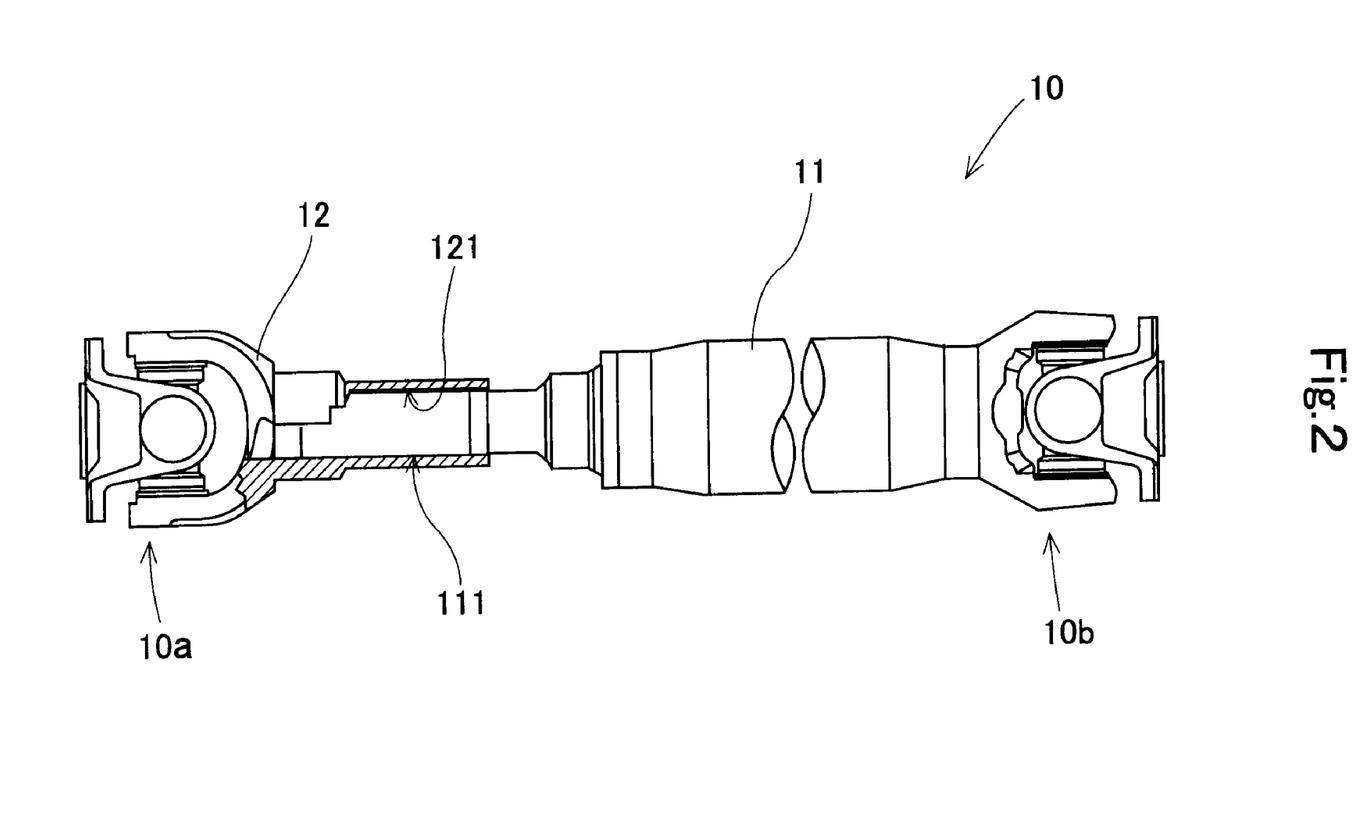
FIG. 2 illustrates a partial cross-sectional diagram of a propeller shaft 10.

A detailed construction of the propeller shaft 10 will be explained with reference to FIG. 2. FIG. 2 illustrates a partial cross-sectional diagram of the propeller shaft 10. As shown in FIG. 2, the propeller shaft 10 is constituted of a first shaft 11, and a second shaft 12.

The first shaft 11 comprises an axial configuration. On a vehicular rear-end side of this first shaft 11, the universal joint 10b, which is connected to the input shaft of the differential gear 40, is placed. On a vehicular front-end side of the first shaft 11, a spline (hereinafter referred to as an "outer-peripheral spline") 111 is formed on an outer peripheral surface. A radial cross-sectional shape of this outer-peripheral spline 111 makes an irregular configuration in the peripheral direction. And, the irregular configuration of the outer-peripheral spline 111 is formed so as to extend in the axial direction. Moreover, this first shaft 11 comprises a carbon steel or alloy steel for mechanical structure, and the like, mainly. In addition, on a superficial portion of the outer-peripheral spline 111, an amorphous carbon-system hard thin film is formed. Concretely, on all of the superficial portions of the outer-peripheral spline 111's convex surfaces, concave surfaces and side surfaces, an amorphous carbon-system hard thin film is formed. Note that, regarding details of this outer-peripheral spline 111, they will be described later.

The second shaft 12 comprises an axial configuration. On a vehicular front-end side of this second shaft 12, the universal joint 10a, which is connected to the output shaft of the transmission 30, is placed. A vehicular rear-end side of the second shaft 12 makes a cylindrical configuration; and, on an inner peripheral surface of this cylindrically-configured section, a spline (hereinafter referred to as an "inner-peripheral spline") 121 is formed. A radial cross-sectional shape of this inner-peripheral spline 121 makes an irregular configuration in the peripheral direction. And, the irregular configuration of the inner-peripheral spline 121 is formed so as to extend in the axial direction. This inner-peripheral spline 121 engages with the outer-peripheral spline 111 peripherally, and is made slidable axially. Moreover, this second shaft 12 comprises a carbon steel or alloy steel for mechanical structure, and the like, mainly.

That is, by means of the fact that the outer-peripheral spline 111 and the inner-peripheral spline 121 engage peripherally, rotations of the second shaft 12 are transmitted to the first shaft 11. Moreover, since the outer-peripheral spline 111 and the inner-peripheral spline 121 can slide axially, it is possible to expand and contract an overall length of the propeller shaft 10.

(3) Detailed Construction of Superficial Portions of Outer-Peripheral Spline 111

Figure 3:
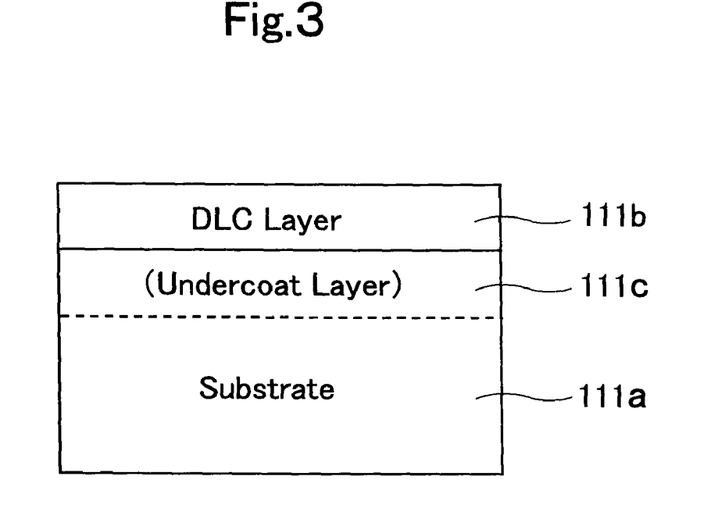
FIG. 3 is a schematic diagram for illustrating an axial cross section of an outer-peripheral spline 111.

Next, a detailed construction of the superficial portions of the outer-peripheral spline 111 will be explained with reference to FIG. 3. FIG. 3 is a schematic diagram for illustrating an axial cross section of the outer-peripheral spline 111. As shown in FIG. 3, the outer-peripheral spline 111 comprises a substrate 111a, and a DLC layer 111b.

The substrate 111a comprises a carbon steel or alloy steel for mechanical structure, and the like, for instance. A superficial portion of this substrate 111a is such that an induction hardening treatment, and so forth, is performed. Moreover, after being subjected to the induction hardening treatment, a treatment, such as diamond blasting or microblasting, is performed onto the superficial portion of the substrate 111a. Here, a diamond blasting treatment can be a treatment that is carried out by projecting resinous particles in which diamond particles are compounded and whose particle diameters are from a few dozen to a few hundred micrometers onto the surface of the substrate 111a, for instance. By means of these treatments, a surface roughness of the substrate 111a is set at from Rz 0.1 μm or more to 5.0 μm or less. Note that it is allowable as well that, onto the superficial portions from among the substrate 111a (that is, one part of the substrate 111a), an undercoat treatment for forming an undercoat layer 111c, such as a nitrided layer, an Si layer, a Cr layer or a CrN layer, can be performed. Of course, a surface roughness of the undercoat layer 111c in the case of being subjected to an undercoat treatment is set at from Rz 0.1 μm or more to 5.0 μm or less. A thickness of the undercoat layer 111c, which is formed by means of this undercoat treatment, is set at 2-10 μm, and so on, for instance.

The DLC layer 111b is formed so as to coat a superficial side of the substrate 111a. Supposing that the undercoat layer 111c is formed on a superficial portion of the substrate 111a, the DLC layer 111b is formed so as to coat a superficial side of the undercoat layer 111c. This DLC layer 111b comprises an amorphous carbon-system hard thin film, such as diamond-like carbon (hereinafter referred to as "DLC"). Concretely, the DLC layer 111b can be DLC; DLC-Si in which silicon (Si) is contained in DLC; DLC-Ti in which titanium (Ti) is contained in DLC; DLC-W in which tungsten (W) is contained in DLC; a laminated film (WC/C) of tungsten carbide (WC) and DLC; and the like.

And, the DLC layer 111b is formed by means of physical vapor deposition method or high-frequency plasma chemical vapor deposition method at 200° C. or less. This DLC layer 111b is such that a surface roughness is from Rz 0.1 μm or more to 5.0 μm or less. This is because the DLC layer 111b has a property of following the surface roughness of the substrate 111a, and thereby the surface roughness of the DLC layer 111b becomes an identical surface roughness to the surface roughness of the substrate 111a substantially. Moreover, the DLC layer 111b is such that a film thickness is from 0.4 μm or more to 10.0 μm or less, and that a hardness is 800 Hv or more. And, an adhesion force of the DLC layer 111b to the substrate 111a is such that 10 N or more is secured.

(4) Experiment on Friction Coefficient μ of DLC Layer 111b

Here, a friction coefficient μ between the outer-peripheral spline 111 and the inner-peripheral spline 121 becomes an index of stick slip that occurs between the outer-peripheral spline 111 and the inner-peripheral spline 121. Concretely, lowering the friction coefficient μ between the outer-peripheral spline 111 and the inner-peripheral spline 121 acts so as to suppress the occurrence of stick slip. Moreover, making the friction coefficient μ a positive gradient with respect to a relative sliding speed V between the outer-peripheral spline 111 and the inner-peripheral spline 121 acts so as to suppress the occurrence of stick slip.

Hence, an experiment was carried out regarding the friction coefficient μ between the outer-peripheral spline 111 and the inner-peripheral spline 121, an index of the occurrence of stick slip.

(a) First of all, a friction coefficient μ between the outer-peripheral spline 111 and the inner-peripheral spline 121 was measured when changing a relative sliding speed V between the first shaft 11 and the second shaft 12. Here, the DLC layer 111b was such that DLC-Si, whose Si content was 20% by weight, was formed by means of direct-current plasma CVD at a processing temperature of 500° C. Moreover, the DLC layer 111b was such that a surface roughness was Rz 2.0 μm, that a film thickness was 3 μm, that an adhesion force was 40 N, that a hardness was 2,000 Hv, and that an undercoat layer was a nitrided layer.

And, the experiment was carried out in a driving-system lubricant while setting a facing-surface pressure between the outer-peripheral spline 111 and the inner-peripheral spline 121 at about 1.7 GPa. For comparison, a similar experiment was carried out regarding the case as well where an outer-peripheral spline 111 with no DLC layer 111b formed was used.

Figure 4:
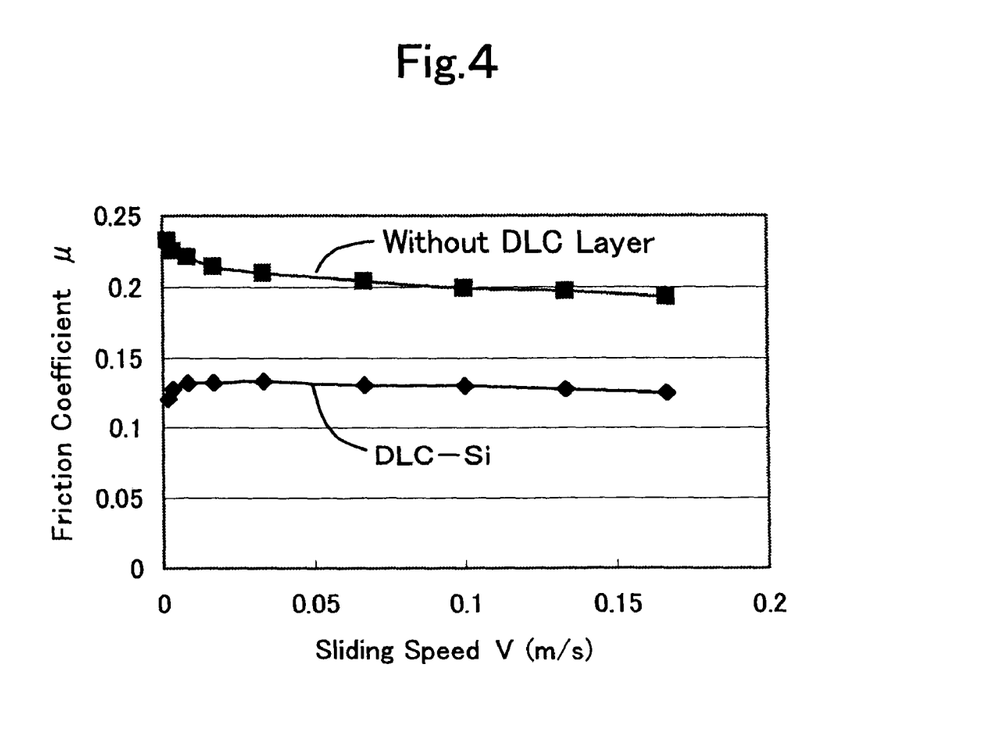
FIG. 4 is a diagram for illustrating results of an experiment.

Results of this experiment are illustrated in FIG. 4. FIG. 4 is a diagram for illustrating results of the aforementioned experiment, and is a diagram for showing so-called μ-V characteristics, diagram in which the sliding speeds V are plotted along the horizontal axis and the friction coefficients μ are plotted along the vertical axis. As shown in FIG. 4, in the case where the DLC layer 111b was formed, a friction coefficient μ when the sliding speed V was 0 m/s, a so-called static friction coefficient μs, was to an extent of being about 0.12. And, being accompanied by the increment of the sliding speed V, the friction coefficient μ increased to at around 0.13. And, a friction coefficient μ when the sliding speed V was about 0.01 m/s or more, a so-called dynamic friction coefficient μd, became constant substantially at around 0.13. For example, in the case where the sliding speed V was 0.1 m/s, a dynamic friction coefficient μd was about 0.13.

Here, the sliding speed V, which might possibly cause stick slip between the outer-peripheral spline 111 and the inner-peripheral spline 121, falls in a range of 0.1 m/s or less. That is, when the DLC layer 111b was formed, the friction coefficient μ became a positive gradient with respect to the sliding speed V in the range where the sliding speed V was 0.1 m/s or less at which stick slip might have possibly occurred. Moreover, the friction coefficient μ became 0.15 or less in the range where the sliding speed V was 0.1 m/s or less. Note that the case where the friction coefficient μ was a positive gradient with respect to the sliding speed V was a case where the friction coefficient μ was constant or increased in compliance with the increasing sliding speed V.

On the other hand, in the case where the DLC layer 111b was not formed, the static friction coefficient μs was to an extent of being about 0.23. And, being accompanied by the increasing sliding speed V, the friction coefficient μ decreased gradually to around 0.19. For example, in the case where the sliding speed was 0.1 m/s, a dynamic friction coefficient μd was about 0.20. That is, the friction coefficient μ did not become a positive gradient with respect to the sliding speed V in the range where the sliding speed V was 0.1 m/or less.

Thus, in the case where the DLC layer 111b was formed, it was possible to make the friction coefficient μ lower in the range in which the sliding speed V fell in the range of 0.1 m/s or less, compared with the case where the DLC layer 111b was not formed. Moreover, by the fact that the DLC layer 111b was formed, it was possible to make the friction coefficient μ a positive gradient with respect to the sliding speed V, which could not be achieved in the case where the DLC layer 111b was not formed. Thus, by forming the DLC layer 111b, since it is possible to lower the friction coefficient μ at the sliding speed V, at which stick slip might possibly occur, and since it is possible to make it a positive gradient, it is possible to suppress the occurrence of stick slip.

Moreover, the DLC layer 111b has a characteristic of being less likely to wear. Therefore, even when the propeller shaft 10 is employed for a long period of time, the above-described μ-V characteristic can be maintained. This is because the μ-V characteristic in the case where the aforementioned DLC layer 111b is formed is such that the influence, which results from the fact that the DLC layer 111b is formed, is extremely great. Specifically, even when a grease or lubricant for driving system, and the like, which is placed between the outer-peripheral spline 111 and the inner-peripheral spline 121, has been consumed, the friction coefficient μ hardly becomes greater. On the contrarily, in the case where the DLC layer 111b is not formed, the friction coefficient μ has become greater when the grease or lubricant for driving system has been consumed. This is because the μ-V characteristic in the case where the DLC layer 111b is not formed is such that the influence, which results from the grease or lubricant for driving system, is extremely great.

Thus, in the case where the DLC layer 111b is formed, it is possible to make the friction coefficient μ lower; it is possible to make the friction coefficient μ a positive gradient with respect to the sliding speed V; and moreover it is possible to maintain this state for a long period of time. Therefore, it is possible to suppress the occurrence of stick slip for a long period of time.

(b) Next, the friction coefficient μ between the outer-peripheral spline 111 and the inner-peripheral spline 121 was measured when changing the surface roughness of the outer-peripheral spline 111. Here, the DLC layer 111b was such that DLC-Si, whose Si content was 20% by weight, was formed by means of direct-current plasma CVD at a processing temperature of 500° C. Moreover, the DLC layer 111b was such that a film thickness was 3.0 μm, that an adhesion force was 30-40 N, that a hardness was 2,000 Hv, and that an undercoat layer was a nitrided layer.

And, the experiment was carried out in a driving-system lubricant while setting a facing-surface pressure between the outer-peripheral spline 111 and the inner-peripheral spline 121 at about 1.7 GPa. For comparison, a similar experiment was carried out regarding the case as well where an outer-peripheral spline 111 with no DLC layer 111b formed was used.

Figure 5:
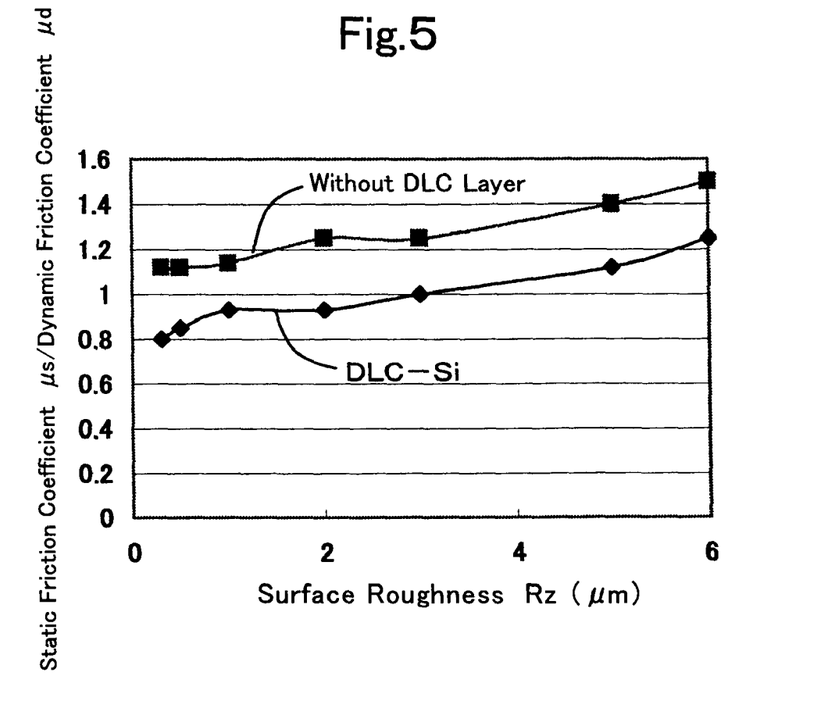
FIG. 5 is a diagram for illustrating results of an experiment.

Results of this experiment are illustrated in FIG. 5. FIG. 5 is a diagram for illustrating results of the aforementioned experiment, and is a diagram in which the surface roughness of the outer-peripheral spline 111 are plotted along the horizontal axis and the ratios of the static friction coefficients μs to the dynamic friction coefficients μd are plotted along the vertical axis. Here, the ratios of the static friction coefficients μs to the dynamic friction coefficients μd that are plotted along the vertical axis in FIG. 5 are the ratios of the static friction coefficients μs with respect to the dynamic friction coefficients μd when the sliding speed V was 0.1 m/s; namely, the values that are produced by means of dividing the static friction coefficients μs by the dynamic friction coefficients g d when the sliding speed V was 0.1 m/s. That is, FIG. 5 is a drawing that makes it possible to judge whether a friction coefficient μ becomes a positive gradient or not with respect to the sliding speed V when changing the surface roughness. That is, in the case where a ratio of a static friction coefficient μs to a dynamic friction coefficient μd that is plotted along the vertical axis is 1.0 or less, a friction coefficient μ becomes a positive gradient with respect to the sliding speed V; and, when it is greater than 1.0, a friction coefficient μ does not become a positive gradient with respect to the sliding speed V. Note that a ratio of a static friction coefficient to a dynamic friction coefficient will be hereinafter set forth as a "static friction coefficient/dynamic friction coefficient."

As illustrated in FIG. 5, in the case where the DLC layer 111b was formed, the static friction coefficient/dynamic friction coefficient became smaller than 1.0 when the surface roughness was set at Rz 3.0 μm or less. Moreover, when the surface roughness was set at Rz 5.0 μm, the static friction coefficient/dynamic friction coefficient was about 1.1.

On the other hand, in the case where the DLC layer 111b was not formed, the static friction coefficient/dynamic friction coefficient was about 1.1 when the surface roughness was set at Rz 1.0 μm or less. When the surface roughness was set at Rz 2.0-3.0 μm, the static friction coefficient/dynamic friction coefficient was about 1.25. Moreover, when the surface roughness was set at Rz 5.0 μm, the static friction coefficient/dynamic friction coefficient was about 1.4.

From above, in the case where the DLC layer 111b was formed, the static friction coefficient/dynamic friction coefficient became smaller when compared with the case where the DLC layer 111b was not formed. That is, forming the DLC layer 111b acts so as to make the friction coefficient μ closer to a positive gradient with respect to the sliding speed V.

And, in the case where the DLC layer 111b was formed, the friction coefficient μ became a positive gradient with respect to the sliding speed V when the surface roughness was Rz 3.0 μm or less in a range where the sliding speed V was 0.1 m/s or less. Moreover, when the surface roughness was set at Rz 3.0-5.0 μm, the difference between the static friction coefficient μs and the dynamic friction coefficient μd was extremely small, even though the friction coefficient μ did not become a positive gradient with respect to the sliding speed V. Therefore, it is possible to believe that the case is substantially equivalent to the case where it became a positive gradient. Therefore, when the surface roughness was set at Rz 5.0 μm or less, it is possible to suppress the occurrence of stick slip. What is more, when the surface roughness was set at Rz 3.0 μm or less, it is possible to suppress the occurrence of stick slip more. In particular, when the surface roughness was set at Rz 0.5 μm or less, it is possible to suppress the occurrence of stick slip much more.

Moreover, the DLC layer 111b has a characteristic of being less likely to wear as described above. Therefore, even when the propeller shaft 10 is employed for a long period of time, it is possible to maintain such a state that the friction coefficient μ becomes a positive gradient with respect to the sliding speed V, or such a state that it is close to a positive gradient.

(c) Next, the friction coefficient μ when changing a type of the DLC layer 111b was measured. Here, the DLC layer 111b was adapted to being DLC-Si, DLC, and WC/C. The DLC layer 111b comprising DLC-Si was DLC, whose Si content was 20% by weight, was formed by means of direct-current plasma CVD at a processing temperature of 500° C., and was such that that a surface roughness was Rz 2.6 μm; that a film thickness was 3 μm; that an adhesion force was 40 N; that a hardness was 2,000 Hv; and that an undercoat layer was a nitrided layer. The DLC layer 111b comprising DLC was formed by means of PVD at a processing temperature of 150° C., and was such that that a surface roughness was Rz 2.5 μm; that a film thickness was 3 μm; that an adhesion force was 20 N; that a hardness was 2,000 Hv; and that an undercoat layer was a nitrided layer. The DLC layer 111b comprising WC/C was formed by means of PVD at a processing temperature of 180° C., and was such that that a surface roughness was Rz 3.6 μm; that a film thickness was 3 μm; that an adhesion force was 40 N; that a hardness was 1,000 Hv; and that an undercoat layer was a nitrided layer.

And, the experiment was carried out in a driving-system lubricant while setting a facing-surface pressure between the outer-peripheral spline 111 and the inner-peripheral spline 121 at about 1.7 GPa and setting the sliding speed V at 0.08 m/s. For comparison, a similar experiment was carried out regarding an outer-peripheral spline 111 with no DLC layer 111b formed as well.

Figure 6:
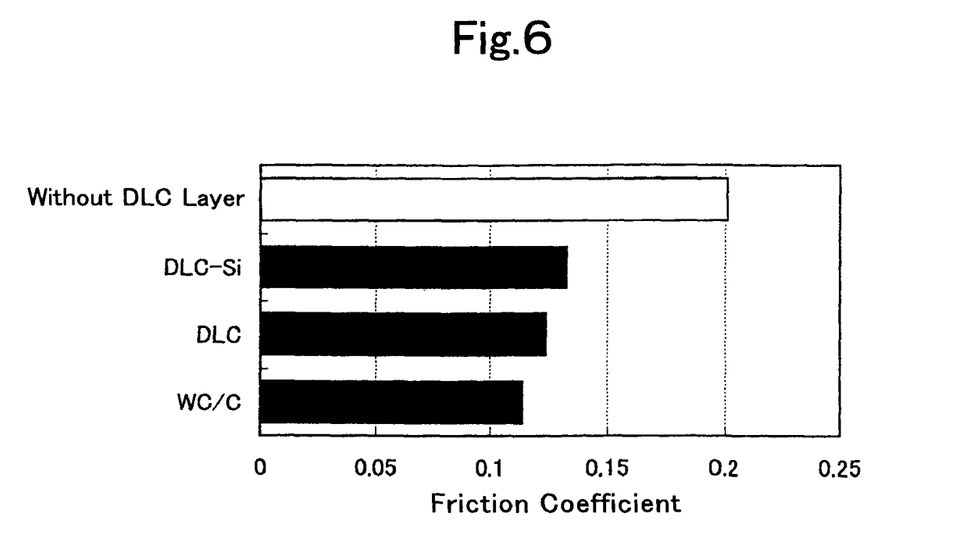
FIG. 6 is a diagram for illustrating results of an experiment.

Results of this experiment are illustrated in FIG. 6. FIG. 6 is a diagram for showing the friction coefficients μ for the respective types of the DLC layer 111b, and that for a comparative example. As shown in FIG. 6, in the case where the DLC-Si was formed, the friction coefficient μ became about 0.13. Moreover, in the case where only the DLC was formed, the friction coefficient μ was about 0.125. In the case where the WC/C was formed, the friction coefficient μ was about 0.12. Moreover, in the case where no DLC layer 111b was formed to be the substrate 111a alone, the friction coefficient μ was about 0.2.

That is, by forming the DLC layer 111b that comprised the DLC-Si, DLC or WC/C, it was possible to make the friction coefficient μ lower when being compared with the case that comprised the substrate 111a alone. Specifically, even when adapting the type of the DLC layer 111b to being the DLC and WC/C instead of the DLC-Si, it was possible to suppress the occurrence of stick slip.

Note herein that, in the aforementioned respective experiments, the film forming of the DLC layer 111b was carried out by means of direct-current plasma CVD at a processing temperature of 500° C. In actuality, however, the DLC layer 111b is adapted so as to being formed by means of PVD, or high-frequency plasma CVD, at a processing temperature of 200° C. or less, preferably 150° C. or less. By means of this, it is possible to inhibit strength degradation, which is caused by the annealing of the substrate 111a that results from film-forming the DLC layer 111b. Note that, in the aforementioned experiments, the film forming was carried out by means of direct-current plasma CVD at a processing temperature of 500° C., this fact does not affect the friction coefficient μ at all.

Note that, although the DLC layer 111*b* was adapted to being formed on the outer-peripheral spline 111 in the aforementioned embodiment modes, it is allowable so that it can be formed on the inner-peripheral spline 121. Even when a DLC layer is formed on the inner-peripheral spline 121, it effects the same advantages as those effected when the DLC layer 111*b* is formed on the outer-peripheral spline 111. Moreover, it is allowable as well to form a DLC layer on both of the outer-peripheral spline 111 and inner-peripheral spline 121. If such is the case, it is possible to suppress the occurrence of stick slip more effectively.

The invention claimed is:

1. A spline shaft for transmitting torque while making it possible to move relatively to each other in axial-line direction, the spline shaft comprising:
    a first shaft being provided with an outer-peripheral spline, which is formed on its outer peripheral surface; and
    a second shaft being provided with an inner-peripheral spline, which is formed on its inner peripheral surface, which engages with said outer-peripheral spline peripherally, and which is made slidable axially;
    at least either one of said outer-peripheral spline and said inner-peripheral spline being equipped with:
    a substrate whose surface is formed to a predetermined surface roughness; and
    an amorphous carbon-system hard thin film, which coats and forms the surface of said substrate,
    wherein said predetermined surface roughness is from Rz (10-point average roughness based on JIS B 0601: 1994) 0.1 μm or more to 5.0 μm or less.

2. The spline shaft set forth in claim 1, wherein:
    a friction coefficient between said outer-peripheral spline and said inner-peripheral spline is 0.15 or less when a relative sliding speed between said first shaft and said second shaft falls in an range of 0.1 m/s or less; and
    a ratio of a static friction coefficient to a dynamic friction coefficient, between said outer-peripheral spline and said inner-peripheral spline, is 1.0 or less when said sliding speed is 0.1 m/s.

3. The spline shaft set forth in claim 1, wherein a film thickness of said amorphous carbon-system hard thin film is from 0.4 μm or more to 10.0 μm or less.

4. The spline shaft set forth in claim 1, wherein a hardness of said amorphous carbon-system hard thin film is 800 Hv or more.

5. The spline shaft set forth in claim 1, wherein said amorphous carbon-system hard thin film contains either one of silicon, tungsten and titanium.

6. The spline shaft set forth in claim 1, wherein an adhesion force of said amorphous carbon-system hard thin film to said substrate is 10 N or more.

7. The spline shaft set forth in claim 6, wherein a treatment of undercoat, which comprises at least either one of nitrided layer, Si layer, Cr layer and CrN layer, is performed onto a superficial portion of said substrate of at least either one of said outer-peripheral spline and said inner-peripheral spline.

8. The spline shaft set forth in claim 1, wherein said amorphous carbon-system hard thin film is formed by means of physical vapor deposition method or high-frequency plasma chemical vapor deposition method at 200° C. or less.

9. The spline shaft set forth in claim 1, wherein said amorphous carbon-system hard thin film is formed on a superficial portion of said outer-peripheral spline.

10. The spline shaft set forth in claim 1, wherein:
    said spline shaft is a propeller shaft for transmitting a driving force of a power unit to a wheel of a vehicle;
    said first shaft is connected to one of said power unit and said wheel at one of its opposite ends, and is provided with said outer-peripheral spline being formed on an outer peripheral surface on the other of its opposite ends;
    said second shaft is connected to the other of said power unit and said wheel at one of its opposite ends, and is provided with said inner-peripheral spline, which is formed on its inner peripheral surface on the other of its opposite ends, which engages with said outer-peripheral spline peripherally, and which is made slidable axially.

11. The spline shaft set forth in claim 1, wherein a lubricant is interposed between said outer-peripheral spline and said inner-peripheral spline.

12. The spline shaft set forth in claim 1, wherein said predetermined surface roughness is from Rz (10-point average roughness based on JIS B 0601: 1994) 0.1 μm or more to 3.0 μm or less.

13. A method for manufacturing spline shaft for transmitting torque while making it possible to move relatively to each other in axial-line direction,
    the spline shaft including:
    a first shaft being provided with an outer-peripheral spline, which is formed on its outer peripheral surface; and
    a second shaft being provided with an inner-peripheral spline, which is formed on its inner peripheral surface, which engages with said outer-peripheral spline peripherally, and which is made slidable axially;
    said spline shaft manufacturing process comprising:
    at least either one of said outer-peripheral spline and said inner-peripheral spline is subjected to coating and forming of an amorphous carbon-system hard thin film on a substrate surface after forming the substrate surface to a predetermined surface roughness,
    wherein said predetermined surface roughness is from Rz (10-point average roughness based on JIS B 0601: 1994) 0.1 μm or more to 5.0 μm or less.

14. The spline shaft manufacturing process set forth in claim 13, wherein said predetermined surface roughness is from Rz (10-point average roughness based on JIS B 0601: 1994) 0.1 μm or more to 3.0 μm or less.

* * * * *